United States Patent
Bastide et al.

(10) Patent No.: US 10,614,145 B2
(45) Date of Patent: Apr. 7, 2020

(54) PRESENTING CONTENT ON A WEBPAGE IN A DESIRED FORMAT

(71) Applicant: International Business Machines Corporation, Armonk, NY (US)

(72) Inventors: Paul R. Bastide, Boxford, MA (US); Jonathan Dunne, Dungarvan (IE); Liam S. Harpur, Dublin (IE); Robert Loredo, North Miami Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 357 days.

(21) Appl. No.: 15/622,758

(22) Filed: Jun. 14, 2017

(65) Prior Publication Data
US 2018/0365252 A1    Dec. 20, 2018

(51) Int. Cl.
G06F 16/958    (2019.01)
G06F 16/955    (2019.01)

(52) U.S. Cl.
CPC .......... *G06F 16/958* (2019.01); *G06F 16/955* (2019.01); *G06F 16/972* (2019.01)

(58) Field of Classification Search
CPC ..... G06F 16/955; G06F 16/958; G06F 16/972
USPC ........................................................ 709/203
See application file for complete search history.

(56) References Cited

U.S. PATENT DOCUMENTS

| | | | | |
|---|---|---|---|---|
| 8,555,158 B2* | 10/2013 | Yao | ......................... | G06F 9/451 715/236 |
| 9,003,279 B2* | 4/2015 | Peters | .................... | G06F 17/218 715/243 |
| 9,003,424 B1 | 4/2015 | Mendes Da Costa et al. | | |
| 9,235,429 B1* | 1/2016 | Sharifi Mehr | .......... | G06F 3/048 |
| 2011/0167336 A1 | 7/2011 | Aitken et al. | | |
| 2012/0254714 A1* | 10/2012 | Peters | .................... | G06F 17/218 715/209 |
| 2014/0344664 A1* | 11/2014 | Bleakley | ............. | G06F 16/9574 715/234 |
| 2015/0095820 A1* | 4/2015 | Fellman | ................ | G06F 3/0481 715/765 |
| 2016/0071143 A1* | 3/2016 | Pokorney | ............... | G06Q 30/02 705/14.43 |

OTHER PUBLICATIONS

Automation Anywhere, INC., "Testing Anywhere," https://www.automationanywhere.com/testing/cpc/automated-web-testing, 2016, pp. 1-2.
Telerik, "Functional UI Testing," http://www.telerik.com/teststudio/functional-testing, 2016, pp. 1-11.

* cited by examiner

*Primary Examiner* — Michael C Lai
(74) *Attorney, Agent, or Firm* — Robert A. Voigt, Jr.; Winstead PC

(57) ABSTRACT

A method, system and computer program product for presenting content on a webpage in a desired format. The webpage(s) previously visited by a user are identified. The format of the content (e.g., tables, graphs) on these webpage(s) is then determined. Furthermore, a future webpage the user will likely visit is determined. Additionally, the format of the content on the future webpage the user will likely visit is determined. The format of the content on the webpage the user is currently visiting is then modified to ensure consistency of the format of the content among the webpage(s) the user previously visited, the future webpage the user will likely visit and the webpage the user is currently visiting.

20 Claims, 5 Drawing Sheets

| DATA TYPE | SYNONYM | DATA FORMAT |
|---|---|---|
| PROFIT | ADVANTAGE; BENEFIT | GREEN |
| LOSS | FORFEITURE; WASTE | RED |
| REVENUE | | BLUE |
| EXPENSE | | YELLOW |

PRESENTING CONTENT ON A WEBPAGE IN A DESIRED FORMAT

TECHNICAL FIELD

The present invention relates generally to web personalization, and more particularly to presenting content on a webpage in a desired format.

BACKGROUND

Webpages can be personalized based on the characteristics (interests, social category, context, etc.), actions (click on button, open a link, etc.), intent (make a purchase, check status of an entity), or any other parameter that can be identified and associated with an individual, therefore providing them with a tailored user experience. Website developers may attempt to personalize webpages in order to increase the browse time of the user as well as to increase the sales conversion (i.e., increase the chances of the user purchasing a good or service sold on the web site).

However, website developers do not take into consideration the format of content previously visualized by the user in personalizing the webpage.

For example, a user may view a graph on a webpage depicting a trend line for a particular product as a green line and then view a subsequent graph on a different webpage depicting a trend line for the same product as a red line. As a result, these graphs may cause confusion for the user due to the inconsistent format of the content. In an attempt to alleviate the confusion, the user may have to spend additional time in ascertaining the similarities and differences between these graphs.

Unfortunately, there is not currently a means for managing format inconsistencies across webpages.

SUMMARY

In one embodiment of the present invention, a method for presenting information on a webpage in a desired format comprises identifying one or more webpages a user previously visited. The method further comprises determining a format of content on the one or more webpages the user previously visited. The method additionally comprises determining a future webpage the user will likely visit. Furthermore, the method comprises determining a format of the content on the future webpage the user will likely visit. Additionally, the method comprises modifying, by a processor, a format of the content on a webpage the user is currently visiting to ensure consistency of format of the content among the one or more webpages the user previously visited, the future webpage the user will likely visit and the webpage the user is currently visiting in response to the format of the content on the webpage the user is currently visiting being inconsistent with the format of the content displayed on the one or more webpages the user previously visited and the future webpage the user will likely visit.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, system and computer program product for presenting content on a webpage in a desired format. In one embodiment of the present invention, webpage(s) previously visited by a user are identified. For example, the webpage(s) previously visited by the user may be identified via the web browser history of the user. The format of the content (e.g., tables, graphs, legends, hyperlinks, HTML elements) on these webpage(s) is then determined. For example, the user may have visited webpage #1 at 9:00 am which depicted a profit line (data type) in the color of green (data format). Furthermore, a future webpage the user will likely visit is determined. In one embodiment, such a future webpage is determined based on the subject matter of the webpage(s) previously visited by the user, the web browser history of the user and/or a history of webpages visited by other users involving similar subject matter as the webpage(s) previously visited by the user. Additionally, the format of the content on the future webpage the user will likely visit is determined. The format of the content on the webpage the user is currently visiting is then modified to ensure consistency of the format of the content among the webpage(s) the user previously visited, the future webpage the user will likely visit and the webpage the user is currently visiting. Such a modification occurs in response to the format of the content on the webpage the user is currently visiting being inconsistent with the format of the same content displayed on the previously visited webpage(s) and the future webpage the user will likely visit. By presenting the content in a format consistent with the format of the content displayed in the webpages the user has previously visited and will likely visit, the user will be less likely to be confused when viewing such content. That is, by managing inconsistencies across webpages, content on a webpage can now be presented in a format (e.g., layout and style) that is more understandable to the user.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
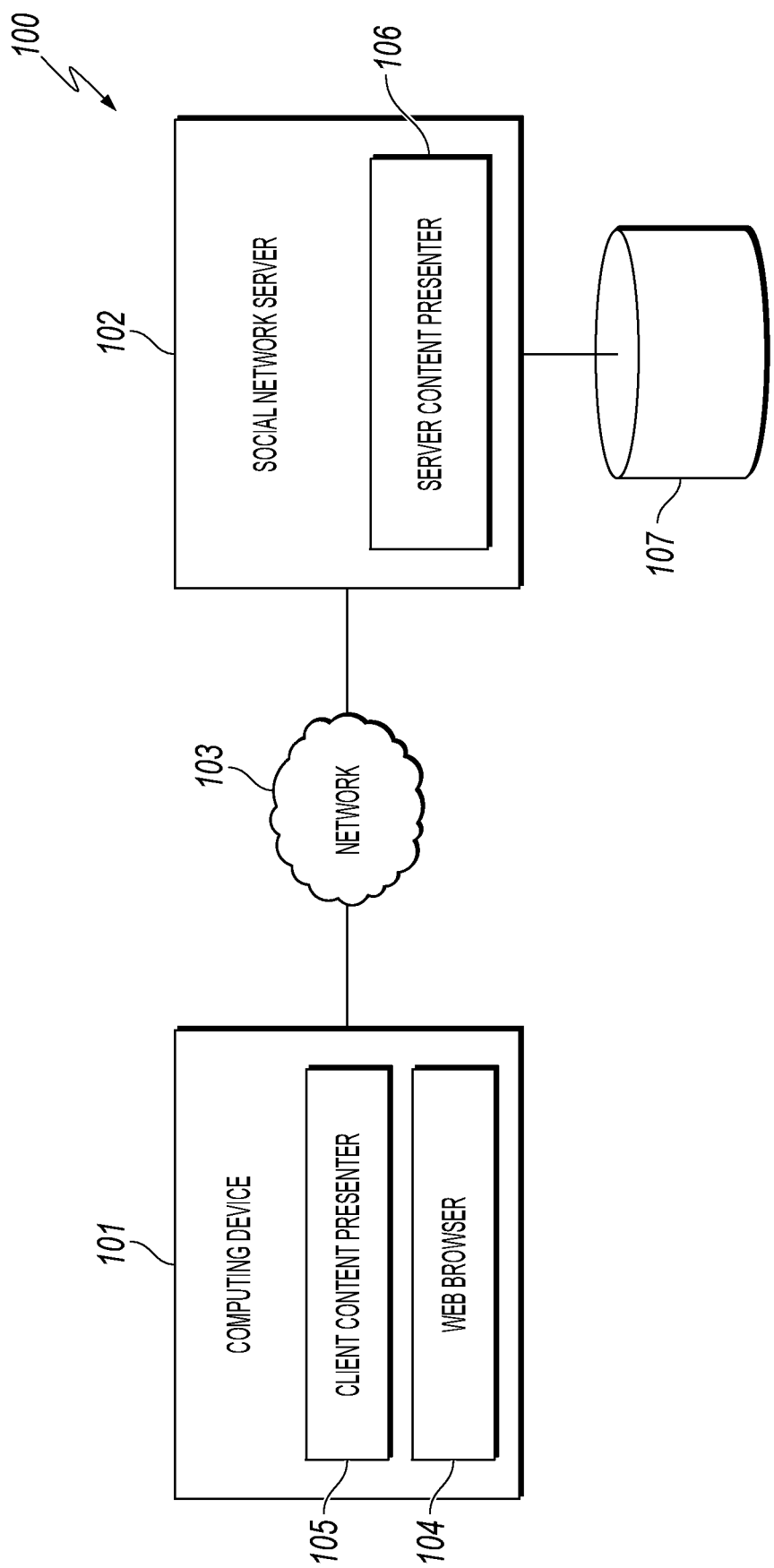
FIG. 1 illustrates a communication system configured in accordance with an embodiment of the present invention.

Referring now to the Figures in detail, FIG. 1 illustrates an embodiment of the present invention of a communication system 100 for practicing the principles of the present invention in accordance with an embodiment of the present invention. Communication system 100 includes a computing device 101 connected to a social network server 102 via a network 103. It is noted that computing device 101 and the user of computing device 101 may both be identified with element number 101.

Computing device 101 may be any type of computing device (e.g., portable computing unit, Personal Digital Assistant (PDA), smartphone, laptop computer, tablet computer, mobile phone, navigation device, game console, desktop computer system, workstation, Internet appliance and the like) configured with the capability of connecting to network 103 and consequently communicating with other computing devices 101 (not shown in FIG. 1) and social network server 102. A description of the hardware configuration of computing device 101 is provided below in connection with FIG. 2.

Social network server 102, which may be a web server configured to offer a social networking and/or microblogging service, enables the user of computing device 101 to send and read other users' posts. "Posts," as used herein, include any one or more of the following: text (e.g., comments, sub-comments and replies), audio, video images, etc. Social network server 102 is connected to network 103 by wire or wirelessly. While FIG. 1 illustrates a single social network server 102, it is noted for clarity that multiple servers may be used to implement the social networking and/or microblogging service. A description of the hardware configuration of social network server 102 is provided below in connection with FIG. 3.

Network 103 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

In communication system 100, computing device 101 may include a web browser 104, which is a software application for retrieving, presenting and traversing information resources on the World Wide Web.

In one embodiment, the principles of the present invention utilize a client-side implementation where computing device 101 includes a software agent, referred to herein as the "client content presenter" 105, configured to present content on a webpage in a desired format (e.g., layout and style) as discussed further below.

Alternatively, in one embodiment, the principles of the present invention utilize a server-side implementation where social network server 102 includes a software agent, referred to herein as the "server content presenter" 106, configured to present content on a webpage in a desired format (e.g., layout and style) as discussed further below.

In one embodiment, the principles of the present invention utilize both client content presenter 105 and server content presenter 106 to present content on a webpage in a desired format (e.g., layout and style) as discussed further below.

In one embodiment, social network server 102 is connected to a database 107 configured to store the browser history (history of visited webpages) of user 101 as well as other users, ratings (user and social network ratings) on webpages, facial responses of users, including user 101, when viewing webpages, etc. Such information may be used by server content presenter 106 as well as client content presenter 105 to modify the format of content on a webpage user 101 is currently visiting appropriately.

System 100 is not to be limited in scope to any one particular network architecture. System 100 may include any number of computing devices 101, social network servers 102, networks 103 and databases 107.

Figure 2:
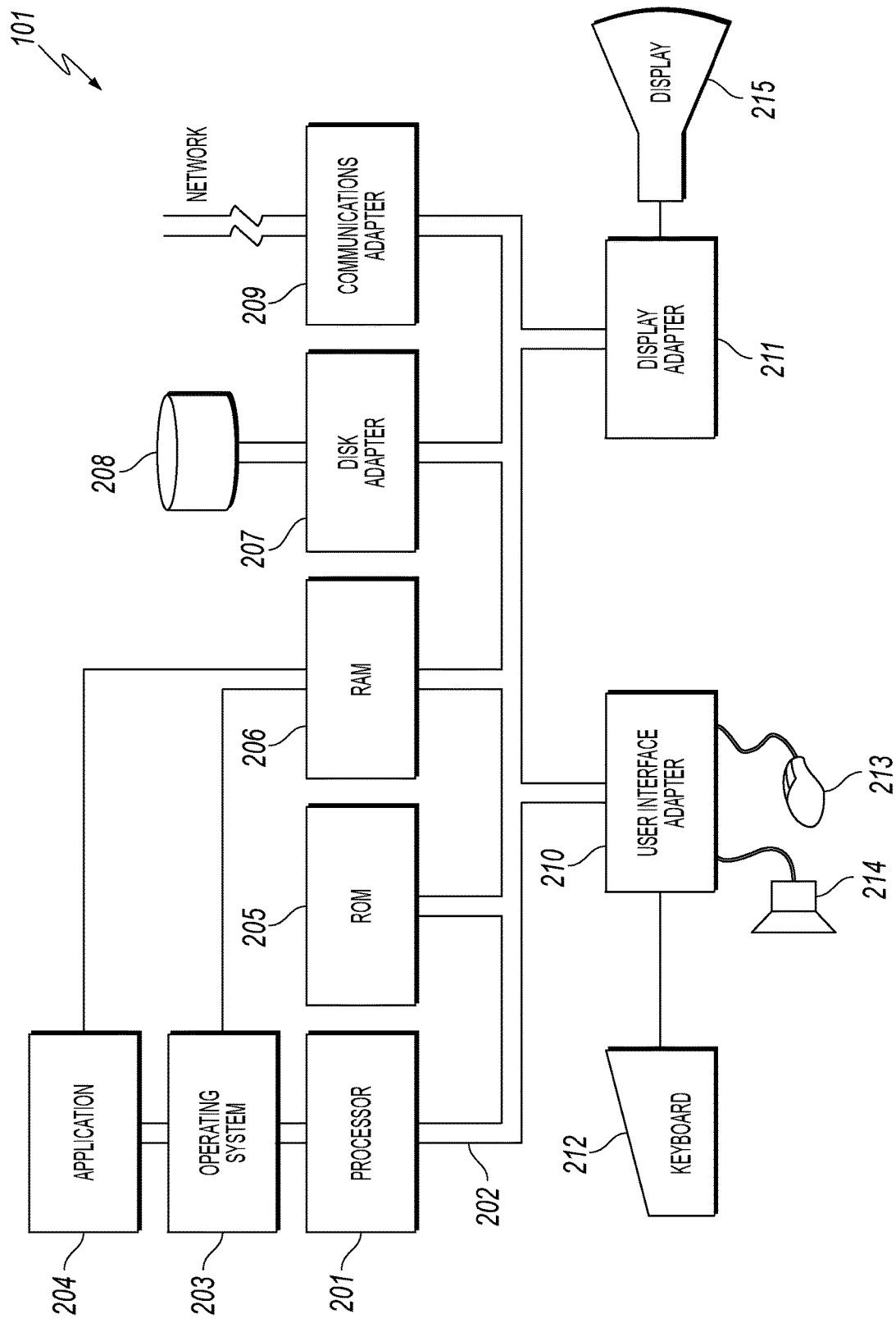
FIG. 2 illustrates a hardware configuration of a computing device in accordance with an embodiment of the present invention.

Referring now to FIG. 2, FIG. 2 illustrates a hardware configuration of computing device 101 (FIG. 1) which is representative of a hardware environment for practicing the present invention. Referring to FIG. 2, computing device 101 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a web browser 104 and/or a client content presenter 105 configured to present content on a webpage in a desired format as discussed below in connection with FIGS. 4-6.

Referring again to FIG. 2, read-only memory ("ROM") 205 is coupled to system bus 202 and includes a basic input/output system ("BIOS") that controls certain basic functions of computing device 101. Random access memory ("RAM") 206 and disk adapter 207 are also coupled to system bus 202. It should be noted that software components including operating system 203 and application 204 may be loaded into RAM 206, which may be computing device's 101 main memory for execution. Disk adapter 207 may be an integrated drive electronics ("IDE") adapter that communicates with a disk unit 208, e.g., disk drive. It is noted that the program for presenting content on a webpage in a desired format, as discussed below in connection with FIGS. 4-6, may reside in disk unit 208 or in application 204.

Computing device 101 may further include a communications adapter 209 coupled to bus 202. Communications adapter 209 interconnects bus 202 with an outside network (e.g., network 103 of FIG. 1) thereby enabling computing device 101 to communicate with other computing devices 101, social network server 102 (FIG. 1) and database 107 (FIG. 1).

I/O devices may also be connected to computing device 101 via a user interface adapter 210 and a display adapter 211. Keyboard 212, mouse 213 and speaker 214 may all be interconnected to bus 202 through user interface adapter 210. A display monitor 215 may be connected to system bus 202 by display adapter 211. In this manner, a user is capable of inputting to computing device 101 through keyboard 212 or mouse 213 and receiving output from computing device 101 via display 215 or speaker 214. Other input mechanisms may be used to input data to computing device 101 that are not shown in FIG. 2, such as display 215 having touch-screen capability and keyboard 212 being a virtual keyboard. Computing device 101 of FIG. 2 is not to be limited in scope to the elements depicted in FIG. 2 and may include fewer or additional elements than depicted in FIG. 2.

Figure 3:
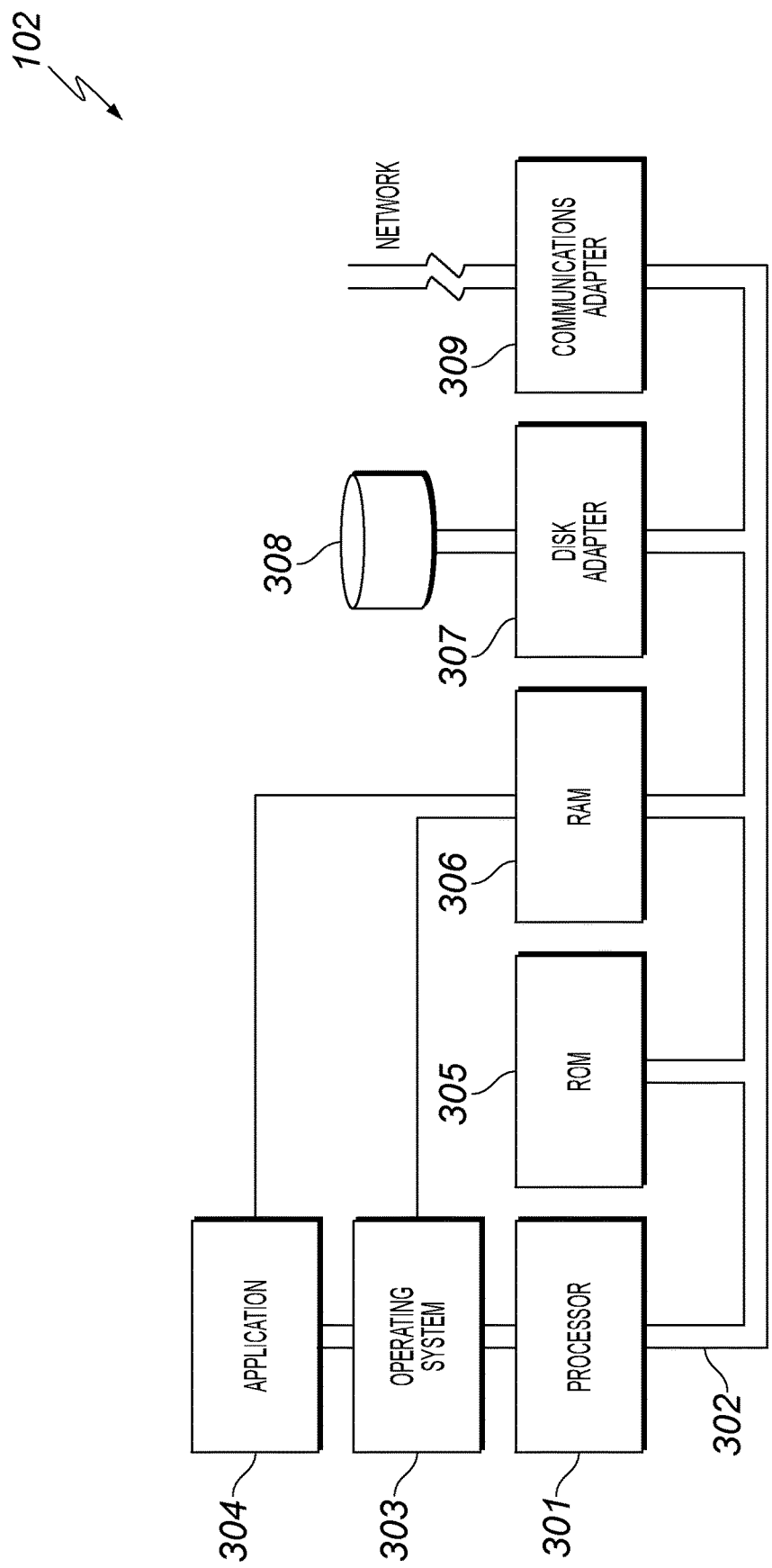
FIG. 3 illustrates a hardware configuration of a social network server in accordance with an embodiment of the present invention.

Referring now to FIG. 3, FIG. 3 illustrates an embodiment of the present invention of a hardware configuration of social network server 102 (FIG. 1) which is representative of a hardware environment for practicing the present invention. Referring to FIG. 3, social network server 102 has a processor 301 coupled to various other components by system bus 302. An operating system 303 runs on processor 301 and provides control and coordinates the functions of the various components of FIG. 3. An application 304 in accordance with the principles of the present invention runs in conjunction with operating system 303 and provides calls to operating system 303 where the calls implement the various functions or services to be performed by application 304. Application 304 may include, for example, a server content presenter 106 configured to present content on a webpage in a desired format as discussed below in connection with FIGS. 4-6.

Referring again to FIG. 3, read-only memory ("ROM") 305 is coupled to system bus 302 and includes a basic input/output system ("BIOS") that controls certain basic functions of social network server 102. Random access memory ("RAM") 306 and disk adapter 307 are also coupled to system bus 302. It should be noted that software components including operating system 303 and application 304 may be loaded into RAM 306, which may be social network server's 102 main memory for execution. Disk adapter 307 may be an integrated drive electronics ("IDE") adapter that communicates with a disk unit 308, e.g., disk drive. It is noted that the program for presenting content on a webpage in a desired format, as discussed below in connection with FIGS. 4-6, may reside in disk unit 308 or in application 304.

Social network server 102 further includes a communications adapter 309 coupled to bus 302. Communications adapter 309 interconnects bus 302 with an outside network (e.g., network 103 of FIG. 1) thereby allowing social network server 102 to communicate with other devices, such as computing devices 101.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, webpages can be personalized based on the characteristics (interests, social category, context, etc.), actions (click on button, open a link, etc.), intent (make a purchase, check status of an entity), or any other parameter that can be identified and associated with an individual, therefore providing them with a tailored user experience. Website developers may attempt to personalize webpages in order to increase the browse time of the user as well as to increase the sales conversion (i.e., increase the chances of the user purchasing a good or service sold on the website). However, website developers do not take into consideration the format of content previously visualized by the user in personalizing the webpage. For example, a user may view a graph on a webpage depicting a trend line for a particular product as a green line and then view a subsequent graph on a different webpage depicting a trend line for the same product as a red line. As a result, these graphs may cause confusion for the user due to the inconsistent format of the content. In an attempt to alleviate the confusion, the user may have to spend additional time in ascertaining the similarities and differences between these graphs. Unfortunately, there is not currently a means for managing format inconsistencies across webpages.

Figure 4:
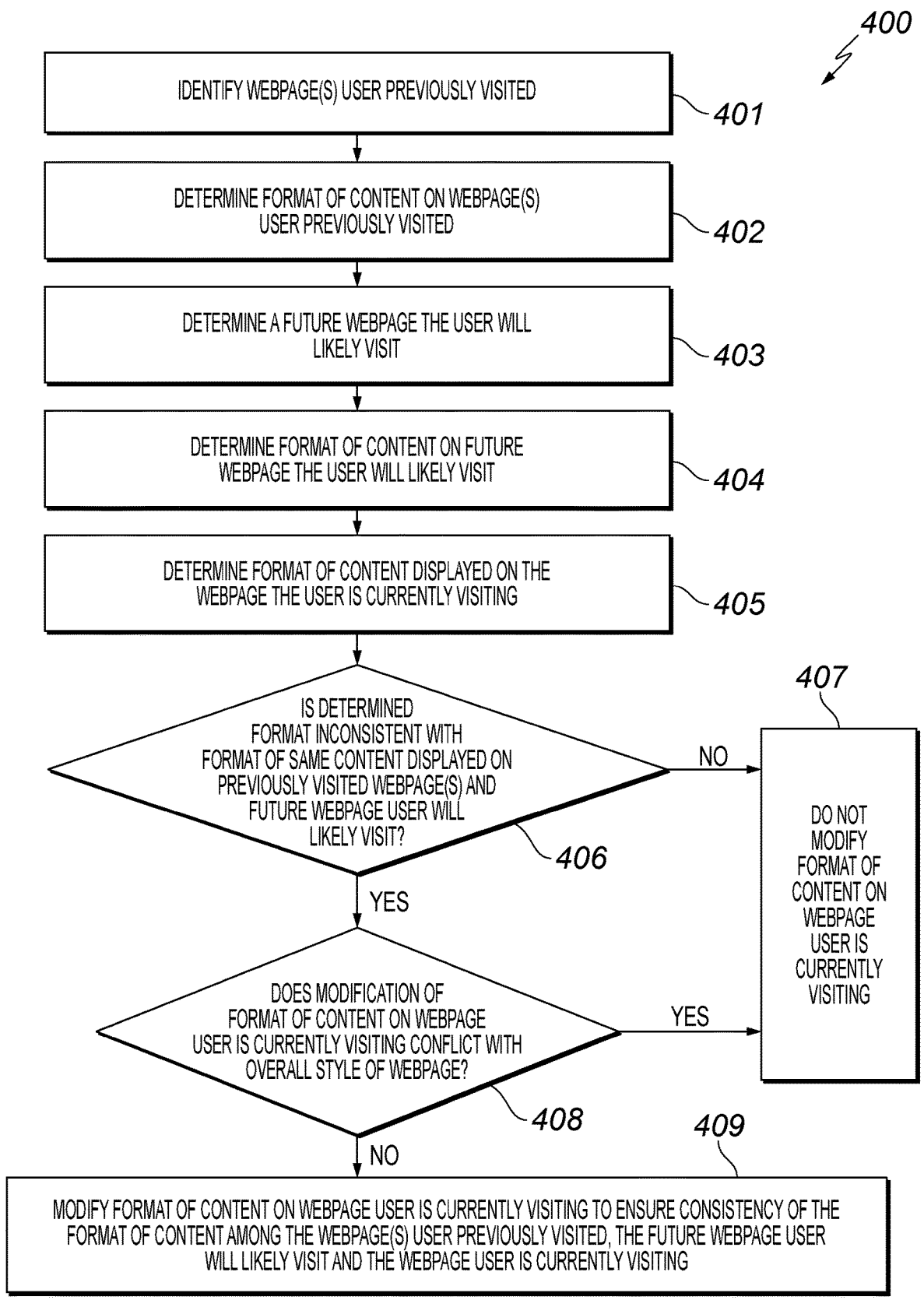
FIG. 4 is a flowchart of a method for presenting content on a webpage in a desired format in accordance with an embodiment of the present invention.
Figures 5, 6:
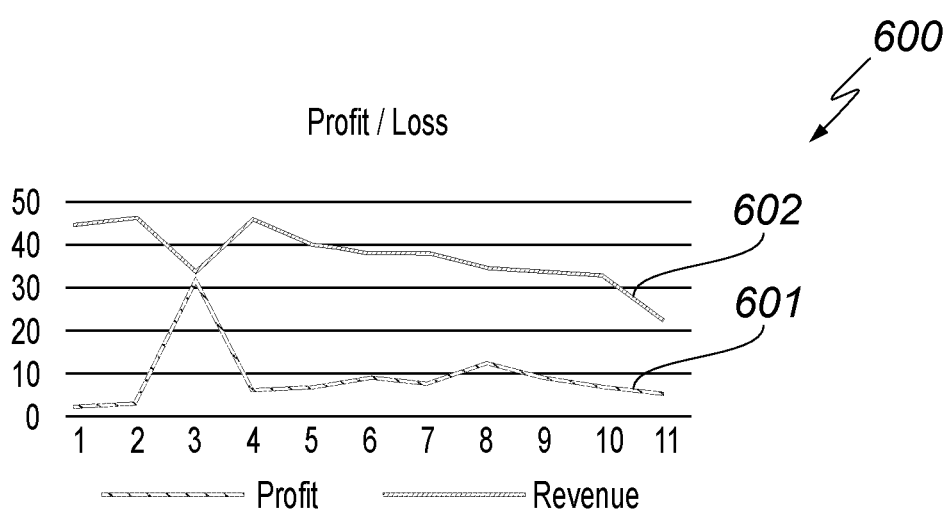
FIG. 5 is a table of information on the content displayed on a webpage in accordance with an embodiment of the present invention.
FIG. 6 illustrates the content displayed on a currently visited webpage whose format is modified in accordance with an embodiment of the present invention.

The principles of the present invention provide a means for managing format inconsistencies across webpages. In particular, the principles of the present invention provide a means for presenting content on a webpage in a format (e.g., layout and style) that is more understandable to the user thereby minimizing the time and confusion the user endures having to reorient himself/herself every time content is shown in a different format as discussed below in connection with FIGS. 4-6. FIG. 4 is a flowchart of a method for presenting content on a webpage in a desired format. FIG. 5 is a table of information on the content displayed on a webpage. FIG. 6 illustrates the content displayed on a currently visited webpage whose format is modified.

As stated above, FIG. 4 is a flowchart of a method 400 for presenting content on a webpage in a desired format in accordance with an embodiment of the present invention.

Referring to FIG. 4, in conjunction with FIGS. 1-3, in step 401, client content presenter 105/server content presenter 106 identifies webpage(s) user 101 previously visited. In one embodiment, server content presenter 106 identifies webpage(s) user 101 previously visited based on receiving the web browser history of user 101, such as from client content presenter 105. In one embodiment, client content presenter 105 has access to the web browser history of user 101, which may be stored in a file on computing device 101. In one embodiment, such a web browser history includes the order in which user 101 visited such webpages. For example, user 101 may have visited webpage #1 at 9:00 am, visited webpage #2 at 7:00 pm and visited webpage #3 at 9:00 pm.

In step 402, client content presenter 105/server content presenter 106 determines the format of content (e.g., tables, graphs, legends, hyperlinks, HTML elements) on the webpage(s) previously visited by user 101. For example, client content presenter 105/server content presenter 106 may determine the data format (e.g., colors) for the data types of the content based on identifying the webpage elements involving the data types, where the properties of such webpage elements include data formats, such as styles (e.g., colors). In another example, the webpage(s) may contain objects associated with various data types, such as profit, loss, days, hours, dollars, and be associated with particular formats, such as particular colors (e.g., green, red, blue, purple). For instance, user 101 may have visited webpage #1 at 9:00 am which depicted a profit line in the color of green, visited webpage #2 at 7:00 pm which depicted a profit line in the color of green and visited webpage #3 at 9:00 pm which depicted a profit line in the color of green. Such an analysis performed by client content presenter 105/server content presenter 106 may be stored in a table such as shown in FIG. 5. In one embodiment, the table is stored in a data storage unit (e.g., memory 205, 305, disk 208, 308) of computing device 101 or social network server 102.

Referring to FIG. 5, FIG. 5 is a table 500 of information on the content displayed on a webpage, such as the webpage(s) previously visited by user 101, in accordance with an embodiment of the present invention. It is noted for clarity that table 500 may store information on the content displayed on multiple webpages, including multiple webpages previously visited by user 101, the current webpage being visited by user 101 and the future webpage likely to be visited by user 101.

As shown in FIG. 5, table 500 includes a list of data types 501 for various objects displayed on the webpage(s), such as the webpage(s) previously visited by user 101. For example, user 101 may have visited a webpage directed to the financial information of a company, such as profits, losses, revenues and expenses. Each of these data types may be displayed (such as in a graph) in a particular data format 502, such as in a particular color. For example, as shown in FIG. 5, profit may have been displayed in the color of green. Loss may have been displayed in the color of red. Revenue may have been displayed in the color of blue. Expense may have been displayed in the color of yellow.

In one embodiment, a data type and a data format of the content that is displayed on a webpage is determined based on determining the object type of the web element. For example, if a web element or style is called "xAxis" and is displayed near a graph, then there is an increased probability that it matches the object labeled "xAxis." Once the object is identified, then the data type (e.g., obtained from legend) as well as the data format (e.g., displayed color) can be identified, such as from the Hypertext Markup Language (HTML) document. In one embodiment, tools, such as Automation Anywhere® and Telerik®, may be used to ascertain the object type of the web element.

Furthermore, the webpage(s), such as the webpage(s) previously visited by user 101, may use synonyms (words or phrases) that mean exactly or nearly the same as the data types stored in table 500. For example, words, such as "advantage" and "benefit," may be synonyms for profit. In another example, words, such as "forfeiture" and "waste," may be synonyms for loss. Such synonyms may be determined by client content presenter 105/server content presenter 106 using natural language processing. For example, such words may have been identified based on being adjacent or near in proximity to the data type in question, where the data type may be obtained from a label on a graph. The meaning of these words may then be determined based on dictionary definitions, such as by utilizing an online dictionary, and if deemed to be similar in meaning within a threshold degree to the data type, then such words may be concluded to be synonyms of the data type. In another embodiment, those words that are adjacent or near in proximity to the data type in question may be compared with a list of synonyms, such as in an online thesaurus, of the data type. If there is a match, then client content presenter 105/server content presenter 106 may conclude that such a term is a synonym of the data type. These synonyms 503 are then stored in table 500.

In step 403, client content presenter 105/server content presenter 106 determines a future webpage user 101 will likely visit. In one embodiment, such a future webpage is determined based on the subject matter of the webpage(s) previously visited by user 101, a web browser history of user 101 and/or a history of webpages visited by other users involving substantially similar subject matter as the webpage(s) previously visited by user 101. In one embodiment, the subject matter of the webpage(s) previously visited by user 101 is determined by client content presenter 105/server content presenter 106 using natural language processing. For example, if the webpage(s) visited by user 101 use terms, such as earnings, financials, charts and profiles, involving the publicly traded company of McDonald's®, then it may be inferred that user 101 is viewing financial information on McDonald's®. Hence, it may be inferred that user 101 will likely visit further webpages discussing the financial information involving the publicly traded company of McDonald's®.

The future webpage that user 101 will likely visit may also be determined based on the web browser history of user 101. For example, the web browser history of user 101 may indicate user 101 visiting webpages depicting financial information on the publicly traded companies of McDonald's® and Intel®. Hence, it may be inferred that user 101 will likely visit further webpages discussing the financial information involving the publicly traded companies of McDonald's® and Intel®.

Furthermore, the future webpage that user 101 will likely visit may also be determined based on the history of webpages visited by other users involving substantially similar subject matter to the webpage(s) previously visited by user 101. A history of webpages visited by other users involving similar subject matter, such as financial information on the publicly traded companies of McDonald's® and Intel®, may be obtained from database 107 based on server content presenter 106 monitoring the webpages visited by other users and storing such history (including the order in accessing such webpages) in database 107. The content of those webpages may then be analyzed, such as via natural language processing. Those webpages with a similar content to the webpages previously visited by user 101 can be determined based on content matching performed by client content presenter 105/server content presenter 106 using natural language processing. Those webpages with a matching content (matching the subject matter of the webpage(s) previously visited by user 101) that exceed a threshold are deemed to involve substantially similar subject matter as the webpages previously visited by user 101. The history of these webpages (such as the order in accessing such webpages) can then be obtained from database 107. Future webpages likely to be visited by user 101 may then be inferred. For example, if the web browser history of other users visiting webpages with similar subject matter as the webpage(s) previously visited by user 101 indicated that after users visited webpages depicting financial information on McDonald's® and Intel®, they viewed a webpage (e.g., webpage #4) depicting financial information on the publicly traded company of British Petroleum®, then it may be inferred that user 101 will likely visit webpage #4 depicting financial information on the publicly traded company of British Petroleum®. As a result, it may be determined that user 101 will likely visit webpage #4 depicting financial information on the publicly traded company of British Petroleum®.

In step 404, client content presenter 105/server content presenter 106 determines the format of content on the future webpage user 101 will likely visit.

For example, if it is determined that user 101 will likely visit webpage #4 depicting financial information on the publicly traded company of British Petroleum®, then the format of the content depicted on the webpage will be determined. For example, as discussed above in connection with step 402, client content presenter 105/server content presenter 106 may analyze the objects depicted on the webpage to determine the data types and data formats of the content displayed on the webpage as well as synonyms for the data types. In another example, client content presenter 105/server content presenter 106 may determine the data format (e.g., colors) for the data types of the content based on identifying the webpage elements involving the data types, where the properties of such webpage elements include data formats, such as styles (e.g., colors).

In step 405, client content presenter 105/server content presenter 106 determines the format of the content displayed on the webpage user 101 is currently visiting (e.g., determines the data format (e.g., color of yellow) for a data type (e.g., profit) of the content on the webpage user 101 is currently visiting). As used herein, "the webpage the user is currently visiting," refers to the website entered by user 101, such as via a uniform resource locator, in the web browser of computing device 101. The webpage the user is currently visiting may or may not be displayed to the user on display 215 of computing device 101 prior to modifying the format of the content on the webpage.

For example, if user 101 is currently visiting a webpage depicting financial information involving profit and loss (data types), then client content presenter 105/server content presenter 106 may determine the data format (e.g., colors) for these data types based on identifying the webpage elements involving the data types, where the properties of such webpage elements include data formats, such as styles (e.g., colors). In another example, client content presenter 105/server content presenter 106 may analyze the objects depicted on the webpage to determine the data types and data formats of the content displayed on the webpage as well as synonyms for the data types.

In step 406, a determination is made by client content presenter 105/server content presenter 106 as to whether the determined format of the content (e.g., data format for the data type of the content, such as legend color on a graph) displayed on the webpage user 101 is currently visiting is inconsistent with the format of the content (e.g., data format for the data type of the content, such as legend color on a graph) on the webpage(s) user 101 previously visited and the future webpage user 101 will likely visit.

If there is no inconsistency between the format of the content displayed on the webpage user 101 is currently visiting with respect to the format of the content displayed on the webpages user 101 previously visited and likely to visit, then, in step 407, client content presenter 105/server content presenter 106 does not modify the content on the webpage user 101 is currently visiting.

If, however, there is inconsistency between the format of the content displayed on the webpage user 101 is current visiting with respect to the format of the content displayed on the webpages user 101 previously visited and likely to visit, then, in step 408, client content presenter 105/server content presenter 106 determines whether modifying the format of the content displayed on the webpage user 101 is currently visiting to be consistent with respect to the format of the content displayed on the webpages user 101 previously visited and likely to visit will conflict with the overall style of the webpage user 101 is currently visiting. In one embodiment, such a determination is based on style attributes attributed to the webpage. For example, style attributes may be obtained from the Hypertext Markup Language (HTML) document that describes the structure of the webpage. A comparison of the style attributes in the HTML document with respect to the changed format is made and if the changed format (e.g., color of green) is being utilized in the webpage greater than a threshold degree, then, in step 407, the content on the webpage user 101 is currently visiting will not be modified. For example, if the format of the content is to be changed, such as changing the legend color to green from red, and the color green is not being used anywhere else in the webpage, then the modification of the content should proceed. However, if such a modification would cause further confusion to the user since the color green is used elsewhere, then such a modification should not proceed.

If the modification of the format of the content displayed on the webpage user 101 is currently visiting does not conflict with the overall style of the webpage, then, in step 409, client content presenter 105/server content presenter 106 modifies the format of the content on the webpage user 101 is currently visiting to ensure consistency of the format of the content among the webpage(s) user 101 previously visited, the future webpage user 101 will likely visit and the webpage user 101 is currently visiting. "Modification," as used herein, includes both modifying the style and layout of the webpage, including modifying the theme or layout based on the aggregated view of the prior webpages visited by user 101. By presenting the content in a format consistent with the format of the content displayed in the webpages that user 101 has previously visited and will likely visit, user 101 will be less likely to be confused when viewing such content. That is, by managing inconsistencies across webpages, content on a webpage can now be presented in a format (e.g., layout and style) that is more understandable to the user.

For example, referring to FIG. 6, FIG. 6 illustrates the content (graph 600) displayed on a currently visited webpage whose format is modified in accordance with an embodiment of the present invention.

As shown in FIG. 6, graph 600 displays a profit line 601 and a revenue line 602. If the data type of profit 601 has the data format of blue, such that it is displayed in blue color, and, it has been determined that the data type of profit 601 has the data format of green in the webpage(s) previously visited by user 101 and in the future webpage likely to be visited by user 101, then the format of the content (graph 600) will be modified to ensure consistency of the format of the content across these webpages. For example, the data format of the data type of profit 601 will be modified to be the color of green as opposed to the color of blue. As a result, the profit line 601 will be displayed in the color of green as opposed to the color of blue. In this manner, user 101 will be less likely to be confused when viewing content displayed on the webpage since the format (e.g., layout, style) will be more consistent with the format of the content displayed in previously visited webpage(s) as well as in the webpage likely to be visited by user 101.

In one embodiment, such a modification occurs prior to user 101 actually viewing the webpage on display 215 of computing device 101. In one embodiment, the modification occurs prior to the transfer of the HTML document to the web browser of computing device 101 from social network server 102. In such an embodiment, social network server 102 (server content presenter 106) may perform such modification, including modifying the source code of the HTML document or a Cascading Style Sheet (CSS) file, such as modifying the style and layout of the webpage. In one embodiment, the modification occurs after the transfer of the HTML document to the web browser of computing device 101 from social network server 102 but prior to the web browser rendering the HTML document into a webpage. In such an embodiment, computing device 101 (client content presenter 105) may perform such modification, including modifying the source code of the HTML document, such as modifying the style and layout of the webpage.

In one embodiment, the modification of the content on the webpage user 101 is currently visiting is modified using client-side scripts.

In one embodiment, the degree of modification of the format of the content on the webpage user 101 is currently visiting is based on when user 101 previously visited the webpage(s), the degree of correlation of webpage content among the webpage(s) user 101 previously visited, the future webpage user 101 will likely visit and the webpage user 101 is currently visiting, a user or social network rating on the webpage user 101 is currently visiting, a facial response, and/or a derived rating for the webpage user 101 is currently visiting.

For example, if the "previously visited webpages" were visited by user 101 weeks ago, then the format of the content on the webpage currently visited by user 101 may not need to be modified to such an extent as if the user 101 visited those webpages a few minutes ago as user 101 may not recall what formats were used for the displayed content.

In another example, the greater the correlation of the content among the webpage(s) user 101 previously visited, the future webpage user 101 will likely visit and the webpage user 101 is currently visiting, the greater the degree of modifying the format of the content on the webpage user 101 is currently visiting to ensure consistency of the format of the displayed content among the webpages (previously visited, currently visited and future) to reduce confusion by user 101. In one embodiment, the degree of correlation of content may be determined by client content presenter 105/server content presenter 106 using natural language processing to determine the extent of these webpages using the same or similar terms.

In a further example, a user or social network rating on the webpage user 101 is currently visiting may be used to determine the degree of modification. For instance, a higher rating may indicate a higher importance thereby necessitating a greater degree of modification to the format of the content on the webpage user 101 is currently visiting to ensure consistency of the format of the displayed content among the webpages (previously visited, currently visited and future) to reduce confusion by user 101. In one embodiment, such ratings may be obtained via rating widgets.

In another example, a facial response may be used to determine the degree of modification. In one embodiment, application 204 of computing device 101 may include a facial recognition software program configured to recognize the emotional state of user 101 when user 101 is viewing a webpage. Such information may be stored in a data storage unit (e.g., memory 205, data unit 208) of computing device 101. In one embodiment, such stored information may be sent to social network server 102 to be used by server content presenter 106 to determine the degree of modification. As an example of using a facial response to determine the degree of modification, if the facial response indicates that user 101 has expended an excessive amount of time of frustration in understanding the content of the webpage of a previously visited webpage, then it may be desirable to modify the format of the content on the webpage currently visited by user 101 so that it matches almost identically to the format of the content on the webpage user 101 previously visited.

In a further example, a derived rating for the webpage user 101 is currently visiting may be used to determine the degree of modification. In one embodiment, a derived rating may be obtained based on the aggregate time user 101 spent on previously visited webpages with similar content. In one embodiment, similarity of content across previously visited webpages can be determined by client content presenter 105/server content presenter 106 using natural language processing to determine the extent of these webpages using the same or similar terms. In one embodiment, the greater the aggregate time user 101 spent on previously visited webpages with similar content, the higher the rating. The higher the rating, the more important it is to ensure that there is consistency among the previously visited webpage(s), the currently visited webpage and the future webpage likely to be visited by user 101.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A system, comprising:
   a memory for storing a computer program for presenting information on a webpage in a desired format; and
   a processor connected to the memory, wherein the processor is configured to execute the program instructions of the computer program comprising:
      identifying one or more webpages a user previously visited;
      determining a format of content on said one or more webpages said user previously visited, wherein said format is determined based on one or more of the following: identifying webpage elements in said one or more webpages said user previously visited involving data types and analyzing objects depicted in said one or more webpages said user previously visited to determine data types;
      determining a future webpage said user will likely visit, wherein said future webpage is determined based on one or more of the following: subject matter of said one or more webpages said user previously visited, a web browser history of said user and a history of webpages visited by other users involving substantially similar subject matter of said one or more webpages said user previously visited;
      determining a format of content on said future webpage said user will likely visit based on one or more of the following: analyzing objects depicted in said future webpage to determine data types and identifying webpage elements in said future webpage involving data types; and
      modifying a format of content on a webpage said user is currently visiting to ensure consistency of format of said content among said one or more webpages said user previously visited, said future webpage said user will likely visit and said webpage said user is currently visiting in response to said format of said content on said webpage said user is currently visiting being inconsistent with said format of said content displayed on said one or more webpages said user previously visited and said future webpage said user will likely visit.

2. The system as recited in claim 1, wherein said one or more webpages said user previously visited is obtained via a web browser history.

3. The system as recited in claim 1, wherein the program instructions of the computer program further comprise:
   determining whether said modification of said format of said content on said webpage said user is currently visiting will conflict with an overall style of said webpage said user is currently visiting.

4. The system as recited in claim 3, wherein said determination is based on style attributes attributed to said webpage said user is currently visiting, wherein said style attributes are obtained from a document that describes a structure of said webpage said user is currently visiting, wherein the program instructions of the computer program further comprise:
   comparing said style attributes in said document with respect to said modified format.

5. The system as recited in claim 1, wherein a degree of modification of said format of said content on said webpage said user is currently visiting is based on one or more of the following: when said user visited said one or more webpages previously visited, degree of correlation of webpage content among said one or more webpages said user previously visited, said future webpage said user will likely visit and said webpage said user is currently visiting, a user or social network rating on said webpage said user is currently visiting, a facial response, and a derived rating for said webpage said user is currently visiting.

6. The system as recited in claim 1, wherein said format of said content on said webpage said user is currently visiting is modified using client-side scripts.

7. The system as recited in claim 1, wherein the program instructions of the computer program further comprise:
determining said format of said content on said webpage said user is currently visiting.

8. The system as recited in claim 7, wherein said format of said content on said webpage said user is currently visiting is determined by properties of a webpage element of said content.

9. The system as recited in claim 1, wherein the program instructions of the computer program further comprise:
determining whether said modification of said format of said content on said webpage said user is currently visiting conflicts with an overall style of said webpage said user is currently visiting.

10. The system as recited in claim 1, wherein said format of said content among said one or more webpages said user previously visited, said future webpage said user will likely visit and said webpage said user is currently visiting comprises one or more of the following: layout and style.

11. A computer program product for presenting information on a webpage in a desired format, the computer program product comprising a computer readable storage medium having program code embodied therewith, the program code comprising the programming instructions for:
identifying one or more webpages a user previously visited;
determining a format of content on said one or more webpages said user previously visited, wherein said format is determined based on one or more of the following: identifying webpage elements in said one or more webpages said user previously visited involving data types and analyzing objects depicted in said one or more webpages said user previously visited to determine data types;
determining a future webpage said user will likely visit, wherein said future webpage is determined based on one or more of the following: subject matter of said one or more webpages said user previously visited, a web browser history of said user and a history of webpages visited by other users involving substantially similar subject matter of said one or more webpages said user previously visited;
determining a format of content on said future webpage said user will likely visit based on one or more of the following: analyzing objects depicted in said future webpage to determine data types and identifying webpage elements in said future webpage involving data types; and
modifying a format of content on a webpage said user is currently visiting to ensure consistency of format of said content among said one or more webpages said user previously visited, said future webpage said user will likely visit and said webpage said user is currently visiting in response to said format of said content on said webpage said user is currently visiting being inconsistent with said format of said content displayed on said one or more webpages said user previously visited and said future webpage said user will likely visit.

12. The computer program product as recited in claim 11, wherein said one or more webpages said user previously visited is obtained via a web browser history.

13. The computer program product as recited in claim 11, wherein the program code further comprises the programming instructions for:
determining whether said modification of said format of said content on said webpage said user is currently visiting will conflict with an overall style of said webpage said user is currently visiting.

14. The computer program product as recited in claim 13, wherein said determination is based on style attributes attributed to said webpage said user is currently visiting, wherein said style attributes are obtained from a document that describes a structure of said webpage said user is currently visiting, wherein the program code further comprises the programming instructions for:
comparing said style attributes in said document with respect to said modified format.

15. The computer program product as recited in claim 11, wherein a degree of modification of said format of said content on said webpage said user is currently visiting is based on one or more of the following: when said user visited said one or more webpages previously visited, degree of correlation of webpage content among said one or more webpages said user previously visited, said future webpage said user will likely visit and said webpage said user is currently visiting, a user or social network rating on said webpage said user is currently visiting, a facial response, and a derived rating for said webpage said user is currently visiting.

16. The computer program product as recited in claim 11, wherein said format of said content on said webpage said user is currently visiting is modified using client-side scripts.

17. The computer program product as recited in claim 11, wherein the program code further comprises the programming instructions for:
determining said format of said content on said webpage said user is currently visiting.

18. The computer program product as recited in claim 17, wherein said format of said content on said webpage said user is currently visiting is determined by properties of a webpage element of said content.

19. The computer program product as recited in claim 11, wherein the program code further comprises the programming instructions for:
determining whether said modification of said format of said content on said webpage said user is currently visiting conflicts with an overall style of said webpage said user is currently visiting.

20. The computer program product as recited in claim 11, wherein said format of said content among said one or more webpages said user previously visited, said future webpage said user will likely visit and said webpage said user is currently visiting comprises one or more of the following: layout and style.

* * * * *